US005518453A

United States Patent [19]
Tribbett

[11] Patent Number: 5,518,453
[45] Date of Patent: May 21, 1996

[54] UNLOADING CONTROL SYSTEM FOR AN AGRICULTURAL COMBINE

[75] Inventor: Lindy M. Tribbett, Moline, Ill.

[73] Assignee: Case Corporation, Racine, Wis.

[21] Appl. No.: 264,637

[22] Filed: Jun. 23, 1994

[51] Int. Cl.[6] .................................................. A01F 12/46
[52] U.S. Cl. .............................. 460/1; 460/114; 460/119; 56/10.2 R; 414/523
[58] Field of Search ................................ 460/114, 116, 460/119, 1; 56/10.2 R; 414/523, 526

[56] References Cited

U.S. PATENT DOCUMENTS

| | | | |
|---|---|---|---|
| 3,834,564 | 9/1974 | Laurent et al. | 214/83.26 |
| 3,938,684 | 2/1976 | Quoiffy et al. | 214/521 |
| 4,241,566 | 12/1980 | Webster | 56/14.6 |
| 4,289,440 | 9/1981 | Walberg | 414/523 |
| 4,332,261 | 6/1982 | Webster | 130/27 |
| 4,459,079 | 7/1984 | Breisford et al. | 414/505 |
| 4,866,920 | 9/1989 | Kerckhove et al. | 56/16.6 |
| 4,907,402 | 3/1990 | Pakosh | 460/114 X |

*Primary Examiner*—Terry Lee Melius
*Attorney, Agent, or Firm*—Rudnick & Wolfe

[57] ABSTRACT

In combination with a combine having an unloading conveyor including an unloading conveyor tube and a material moving member or auger, a control system for preventing unexpected movements of the unloading tube or unexpected operation of the material moving member following an interruption in power to the control system as through shutting off the engine of the combine. The control system of the present invention remains effective to prevent unexpected movement of the unloading tube and unexpected operation of the material moving member until the system is purposefully reset by the operator to effect operation of the unloading conveyor components. The control system of the present inventor also prevents inadvertent engagement of the material moving member upon moving the unloading conveyor tube from its transport position.

42 Claims, 4 Drawing Sheets

UNLOADING CONTROL SYSTEM FOR AN AGRICULTURAL COMBINE

FIELD OF THE INVENTION

The present invention generally relates to unloading systems for agricultural combines. More particularly, the present invention relates to a system for controlling operation of an unloading conveyor system so as to prevent unexpected movement of the unloading conveyor tube or the material moving member following an interruption of power thereto.

BACKGROUND OF THE INVENTION

Agricultural combines traditionally have a grain storage bin wherein threshed and cleaned grain is stored. As the combine harvests and threshes crop materials in the field, grain is continuously delivered to the storage bin or tank. As will be appreciated, continuous field operation of a combine is generally limited by the capacity of the storage bin to hold the cleaned grain. When the storage bin is full, the combine operator must normally cease the harvesting and threshing operation to unload cleaned grain from the storage bin to a receiving vehicle.

Unloading conveyors for harvesters, such as combines, typically take the form of an unloading tube in which a power driven material moving member or auger is disposed. The unloading conveyor tube is mounted to a frame of the combine for movement between a transport position, whereat the unloading tube is positioned generally parallel to the frame of the combine, and an unloading position whereat the unloading tube extends away from the combine frame to facilitate discharge of material into a truck or other suitable vehicle arranged along side the combine. The unloading tube is swung between positions under the influence of a power driven actuator. The auger within the unloading tube is operated under the influence of a drive mechanism including a clutch which is shiftable between clutch-engaged and clutch-disengaged positions.

Unloading of the storage bin is normally activated by engaging a switch which causes the unloading tube to automatically move between positions while conjointly controlling operation of the auger. Should an unloading operation be conducted while the combine continues to harvest and thresh crop material, this requires the operator to direct his attention to several functions at one time. That is, the operator must continually monitor the crop material which is being harvested at the front of the combine, scan the numerous monitors which display various indications on a control panel, while observing the movement of the unloading tube from an inboard to a fully outboard position for purposes of unloading the storage bin.

For any of several different reasons, the operator may temporarily discontinue the harvesting operation and shut off or shut down the combine. The cab region of the combine has relatively tight space constraints therein partially because of the number of various controllers that are arranged in and about the operator's seat for convenient access to the operator. Occasionally, as the operator leaves the cab region, one or more of the switches and/or controllers can be inadvertently moved from one position to another. Alternatively, the operator's attention may be diverted such that the operator is unmindful of changing a switch at the last moment before leaving the cab region of the combine. Thus, when the operator returns to the cab region of the harvester, he may be unaware or forgetful of any change in the various switches and controllers arranged in and about the cab region. Accordingly, when the engine is again started, the change in state of the various switches and/or controllers can cause unexpected operation of the unloading conveyor.

Following an operator's return to the combine, it is not uncommon for the unloading tube to inadvertently move under the influence of its actuator upon restarting of the engine because the operator inadvertently moved the switch upon leaving the cab region, re-entering the cab region or because the operator failed to remember the last setting of the switch. The problems associated with unexpected movement of the conveyor tube are apparent to those skilled in the art. Moreover, and for many of the same reasons discussed above, the unloading conveyor may move material through the unloading tube because of an inadvertent setting on a switch or lever. Thus, often times, clean grain is lost in the field. Of course, if operation of the auger is not quickly detected, there can be a considerable loss of clean grain which is exhausted from the unloading conveyor or tube.

Thus, there is a need and a desire for a combine control system for preventing inadvertent movement of the conveyor tube between positions and for preventing inadvertent discharge of cleaned grain material following an interruption of power to the controllers used to condition the unloading conveyor system for operation.

SUMMARY OF THE INVENTION

In view of the above, and in accordance with the present invention, there is provided a system for preventing unexpected movements of an unloading tube or unexpected operation of a material moving member arranged in association with an unloading conveyor following an interruption in power to the control system and until the operator positively acts to control movement of the unloading tube or operation of the material moving member. The unloading tube of the conveyor is arranged on a frame of the combine for swinging movement between a fully inboard or storage position and a predetermined outboard or unloading position to effect unloading of clean grain from a clean grain storage area on the combine frame. The material moving member or auger of the unloading conveyor is powered by a drive mechanism which includes a clutch shiftable between clutch-engaged and clutch-disengaged positions.

That portion of the control system for preventing unexpected movement of the unloading conveyor tube includes an operator controlled unloading switch which is adapted for connection to a power source on the combine. The switch is shiftable to any of three different positions including a first position for initiating movement of the unloading conveyor tube into an unloading position under the influence of an actuator, a second position for initiating movement of the unloading conveyor tube into a transport position under the influence of the actuator, and a neutral position whereat the actuator is disabled from positioning the unloading conveyor tube. The control system further includes an electrical system which is responsive to the position of the unloading conveyor and which connects the unloading switch to the actuator thereby selectively positioning the unloading conveyor as a function of the position of the switch. The electrical system further includes electrical circuitry for preventing actuation of the actuator and thereby preventing unexpected movements of the unloading conveyor tube following disruption of power to the switch until the unloading switch is moved to a neutral position and thence to either of the other two positions.

In a preferred form of the invention, the actuator for swinging the unloading conveyor includes a double-acting hydraulic cylinder. The electrical system includes a first electrical circuit connected to the unloading switch and to a first electrically controlled valve for controlling operation of the cylinder in a first direction. The electrical system further includes second electrical circuit connected to the unloading switch and to a second electrically controlled valve for controlling operation of the cylinder in a second direction opposed to the first direction.

To enable the electrical system to be responsive to the position of the unloading conveyor, the first electrical circuit preferably includes a sensor for monitoring the position of the unloading conveyor tube relative to a transport position and a second sensor for monitoring the position of the unloading conveyor relative to a fully outboard or unloading position. In a most preferred form of the invention, a two-state controller, preferably in the form of a relay, is connectable to the power source on the combine and is responsive to the position of the unloading switch for enabling the electrical circuitries. The electrical system may further include an indicator for providing an indication of when the unloading conveyor is in an unloading position.

That portion of the system for controlling operation of the material moving member or auger includes a manually operational two-position switch adapted for connection to the power source on the combine. An electrical system which is responsive to the position of the unloading conveyor tube electrically connects the switch to a clutch actuator which conditions the clutch between engaged and disengaged clutch conditions thereby controlling operation of the material moving member or auger as a function of switch actuation. The electrical system includes electrical circuitry for preventing engagement of the clutch drive mechanism thereby preventing actuation of the auger following an interruption of power to the operational switch until the electrical system is reset through manipulation of the switch.

In a preferred form of the invention, the auger drive mechanism includes a driving belt and the clutch includes a belt idler shiftable under the influence of the clutch actuator between clutch-engaged and disengaged positions. In a clutch engaged position, the belt is tensioned under the influence of the belt idler to transmit power to drive the material moving auger. In a clutch-disengaged position, the clutch actuator is inoperative to move the belt idler thus allowing the belt to remain slack to not transmit power to drive the material moving auger.

The electrical circuitry is arranged between the operational switch and the clutch and includes a first two-state controller that is responsive to the position of the operational switch and a second two-state controller. The second two-state controller is connected to the first controller and is responsive to the position of the operational switch and to the sensor for detecting the position of the unloading conveyor relative to the transport position. The first and second two-state controllers are preferably configured as relays.

In a preferred form of the invention, the operational switch is designed as a momentary pushbutton switch arranged in the cab region of the combine. Moreover, the electrical system includes an apparatus for indicating that the electrical system requires resetting before the material moving auger is operational following a disruption of power to the operational switch.

In a most preferred form of the invention, the control system is arranged on a combine which is propelled across the field by a self-propelled engine. In this embodiment, a sensor or monitor is provided for detecting when the engine on the combine is being operated. The sensor is operational to effectively disconnect the control system of the present invention from the electrical power source on the combine when the engine is stopped. As mentioned above, the interruption of power to the control system effectively disables both the actuator for moving the unloading conveyor tube between inboard and outboard positions as well as disabling the drive mechanism for operating the clutch driven power, material moving auger.

The combine control system of the present invention prevents unexpected movement of the unloader conveyor upon starting of the combine. Moreover, an advantageous feature of the present invention is the ability to prevent inadvertent discharge of material from the clean storage area of the combine upon starting of the engine. The system also prevents inadvertent discharge of material from the clean storage area of the combine when the conveyor is in the transport position and prevents inadvertent engagement of the auger upon moving the conveyor from the transport position to the unloading position. Following an interruption in power to the control system, as through shutting off the engine or otherwise, the operator is required to positively act to condition the control system to enable movement of the unloading conveyor tube and to effect the purposeful discharge of clean grain material from the combine.

These and other advantageous features of the present invention will become readily apparent from the following detailed description, the appended claims, and the following drawings.

DETAILED DESCRIPTION OF THE DRAWINGS

DETAILED DESCRIPTION OF THE PRESENT INVENTION

Figure 1:
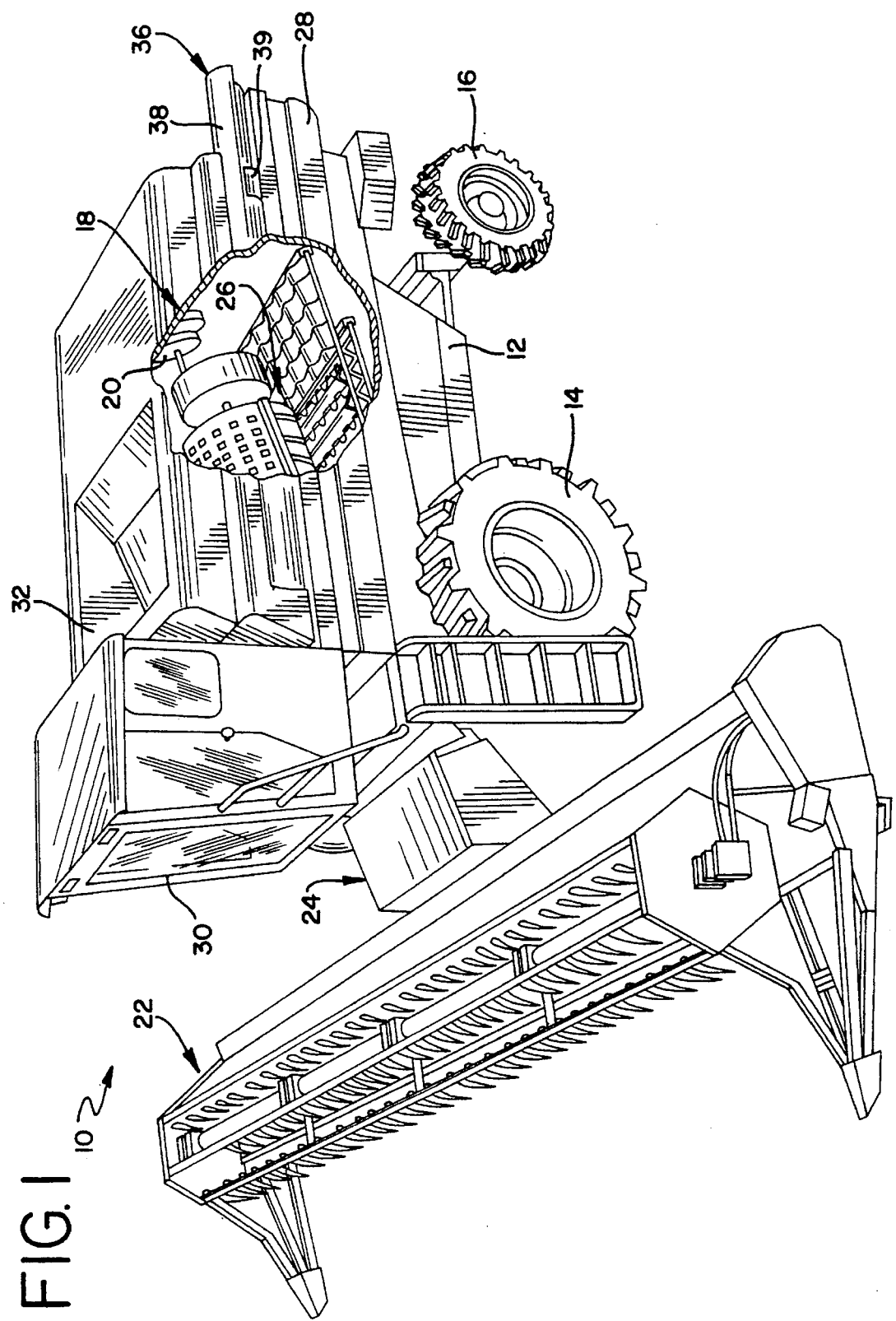
FIG. 1 is a perspective view of a self-propelled combine embodying teachings of the present invention.

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals refer to like parts throughout the several views, there is shown in FIG. 1 a self-propelled combine 10 which is preferably of the type sold by Case Corporation of Racine, Wis. under Model No. 1800. The combine 10 includes a mobile frame 12 mounted for movement across a field by a pair of primary drive wheels 14 arranged toward a front of the combine and a pair of smaller steering wheels 16 arranged toward a rear of the combine. The combine is propelled by a propulsion assembly 18 including a self-propelled engine 20 which, through a series of belts and/or sprocket chains, is drivingly connected to the operational components of the combine.

As is conventional, the combine 10 further includes a header assembly 22 which is supported for vertical movement relative to the frame 12 as by a feeder assembly 24. The feeder assembly 24 rearwardly advances crop material severed by the header assembly 22 toward a threshing assembly generally indicated by reference numeral 26. The threshing assembly 26 is arranged within a housing 28 supported on the frame 12. Frame 12 furthermore supports an operator cab region 30 and a grain tank or bin 32. Inside the combine, the crop material is threshed so that the straw and chaff are expelled out of the rear of the combine and the clean grain is stored in the grain tank or bin 32.

Figure 2:
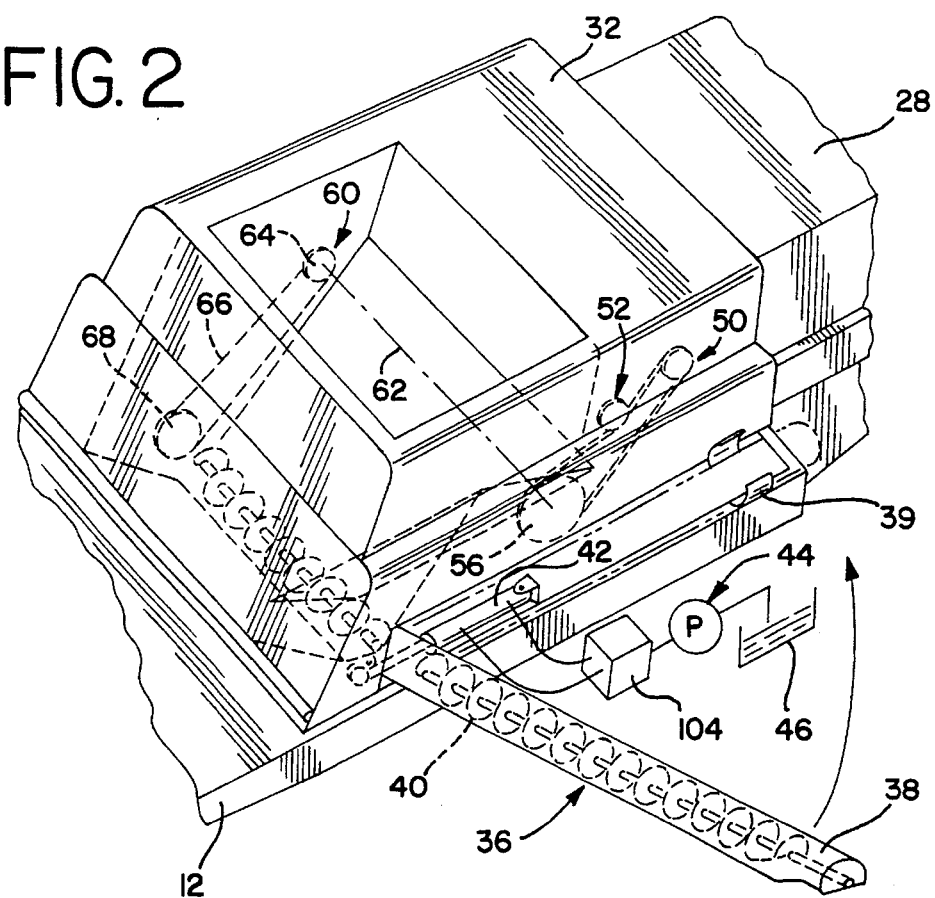
FIG. 2 is a perspective view showing an upper portion of the combine having an unloading conveyor with a material moving member and operating mechanism arranged in combination therewith.

To unload the harvested and separated grain from tank 32, combine 10 is provided with an unloading conveyor 36. As shown in FIG. 2, the unloading conveyor 36 includes an unloading tube 38 and a material moving member preferably in the form of an auger 40, which is arranged in combination with and for moving grain through and discharging grain from the distal end of the tube 38 when the auger is operated.

In the illustrated embodiment, the unloading tube 38 is swingable from an inboard or road transport position (shown in FIG. 1) wherein the tube 38 extends generally parallel to the longitudinal axis of frame 12 and is removably received within a cradle or saddle 39 to an outboard or unloading position (shown in FIG. 2). The unloading tube 38 is articulately connected to the combine 10 for pivotal swinging movement under the influence of a driver 42 which can be remotely controlled from the cab region 30 of the combine. In a preferred form of the invention, the driver 42 comprises a linearly distendable hydraulic actuator such as a double acting hydraulic cylinder which is fluidically coupled to a source of pressurized hydraulic fluid 44 such as a pump and a hydraulic fluid sump 46 arranged on the combine 10.

Figure 3:
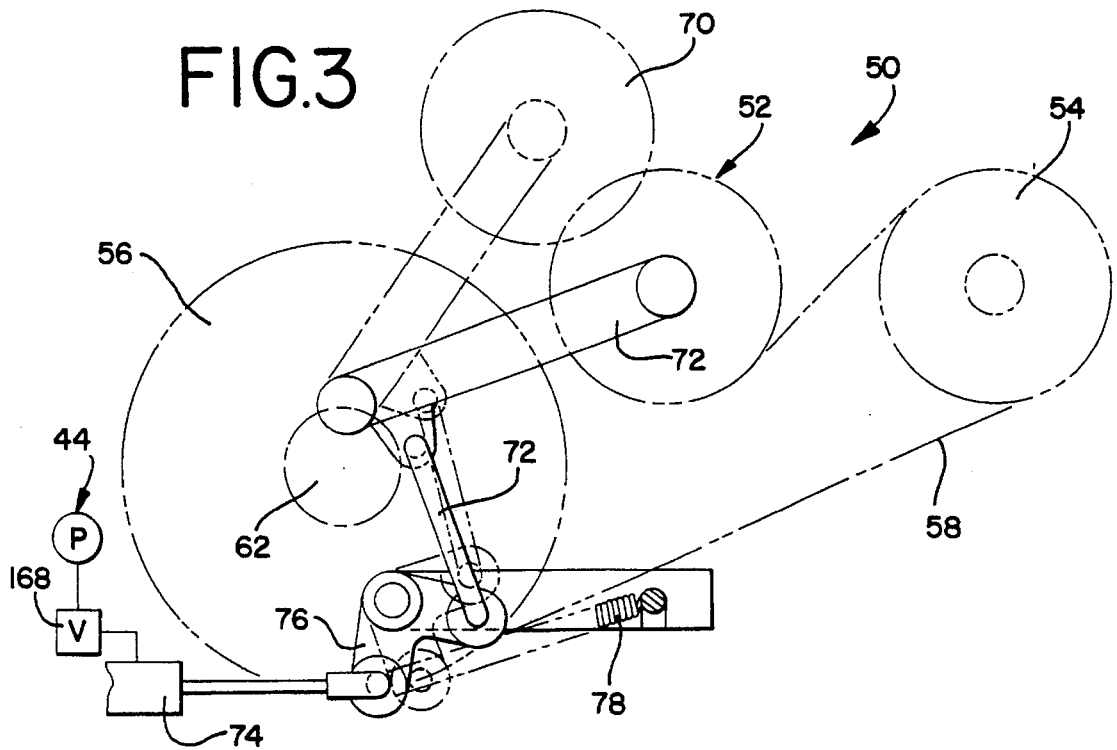
FIG. 3 is a side elevational view of a drive mechanism for effecting operation of the material moving member.

The grain contained within the tank 32 can be discharged therefrom as through operation of the material moving member or auger 40. The material moving auger 40 is operated under the influence of a drive mechanism 50 which can be remotely controlled from the cab region 30 (FIG. 1) of the combine. Preferably, the drive mechanism 50 is selectively controlled by a hydraulically actuated clutch 52. As shown in FIG. 3, the drive mechanism 50 includes a drive member or pulley 54, a driven member or pulley 56, and a belt 58 which is entrained about the drive and driven members 54 and 56, respectively. The driven member 56 is connected to and drives the material moving member 40.

In the illustrated form shown in FIG. 2, a transmission system 60 interconnects the driven member 56 with the auger 40. In the illustrated embodiment, the transmission system 60 includes a shaft 62 which is rotatably driven with member 56. A pulley 64 is fixed to that end of the shaft 62 opposite from member 56. A driving belt 66 passes about pulley 64 and about another pulley 68 fixed on the shaft of the material moving auger 40.

Transmission of power from the drive member 54 to the driven member 56 is achieved through the clutch 52. Clutch 52 includes an idler 70 rotatably mounted on one end of an idler arm 72. The idler arm 72 is pivotally carried by the housing 28 (FIG. 1) for swinging movement between a clutch-engaged position and a clutch-disengaged position.

The clutch 52 is preferably operated under the influence of a hydraulic actuator 74. One end of the actuator 74 is connected to the combine while the opposite end of the actuator is connected to a pivotal bell crank lever 76. The bell crank lever 76 is connected to the idler arm 72 as through a connecting rod 77. A restoring spring 78 tends to cause the bell crank lever 76 to pivot in the direction which moves the tension idler 70 away from the driving belt 58. Retraction of the driver or actuator 74 causes the bell crank lever 76 to move against the action of the spring 78 thereby causing the tension idler 70 to engage and remove slack from the drive belt with the result that the belt 58 is tensioned to rotate the driven member 56 of the drive mechanism and the auger 40 is rotatably driven by means of the transmission system 60 described above.

Figure 4:
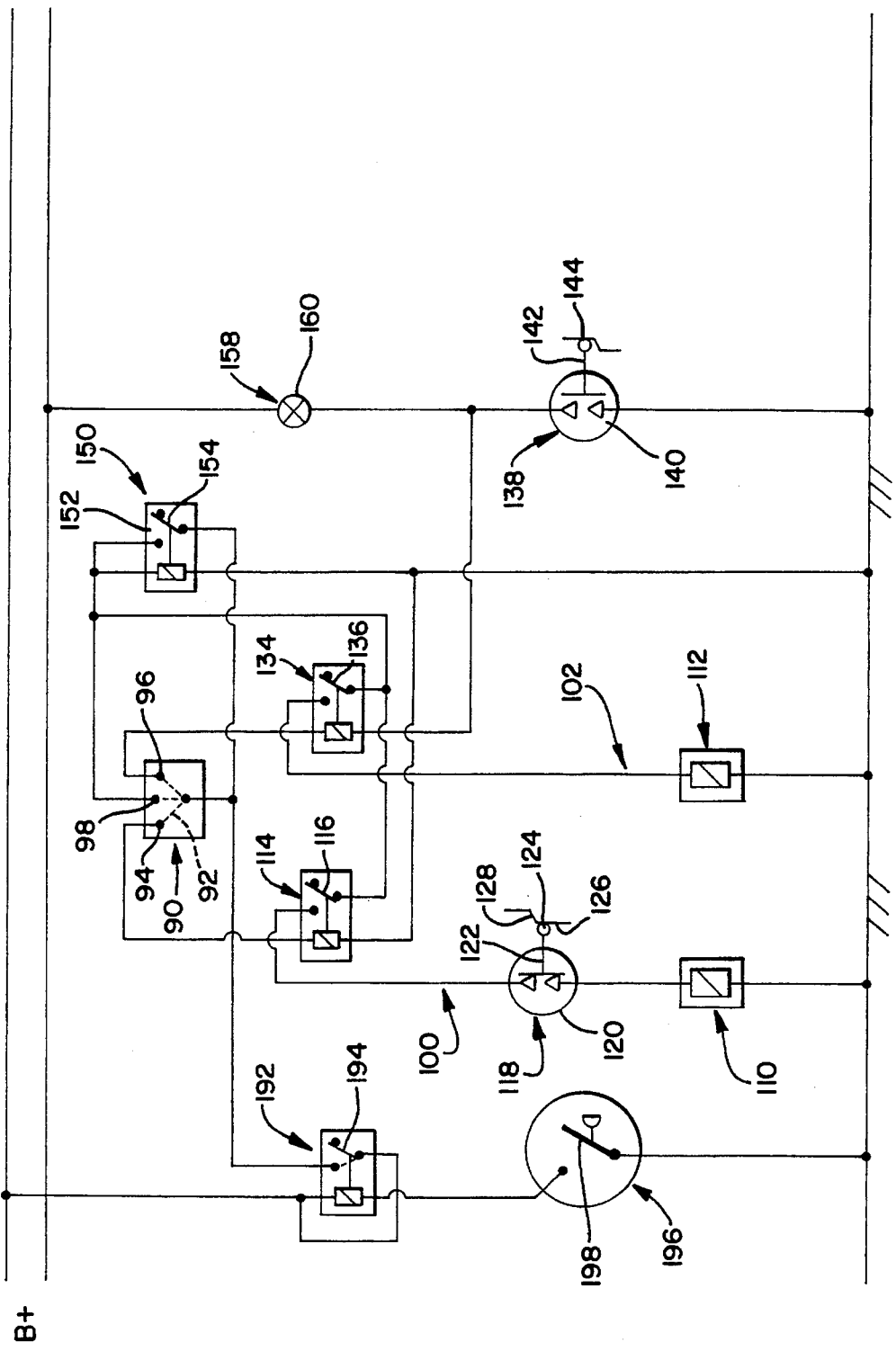
FIG. 4 is a schematic illustration of electrical circuitry for controlling movement of the unloading conveyor between inboard and outboard positions.
Figure 5:
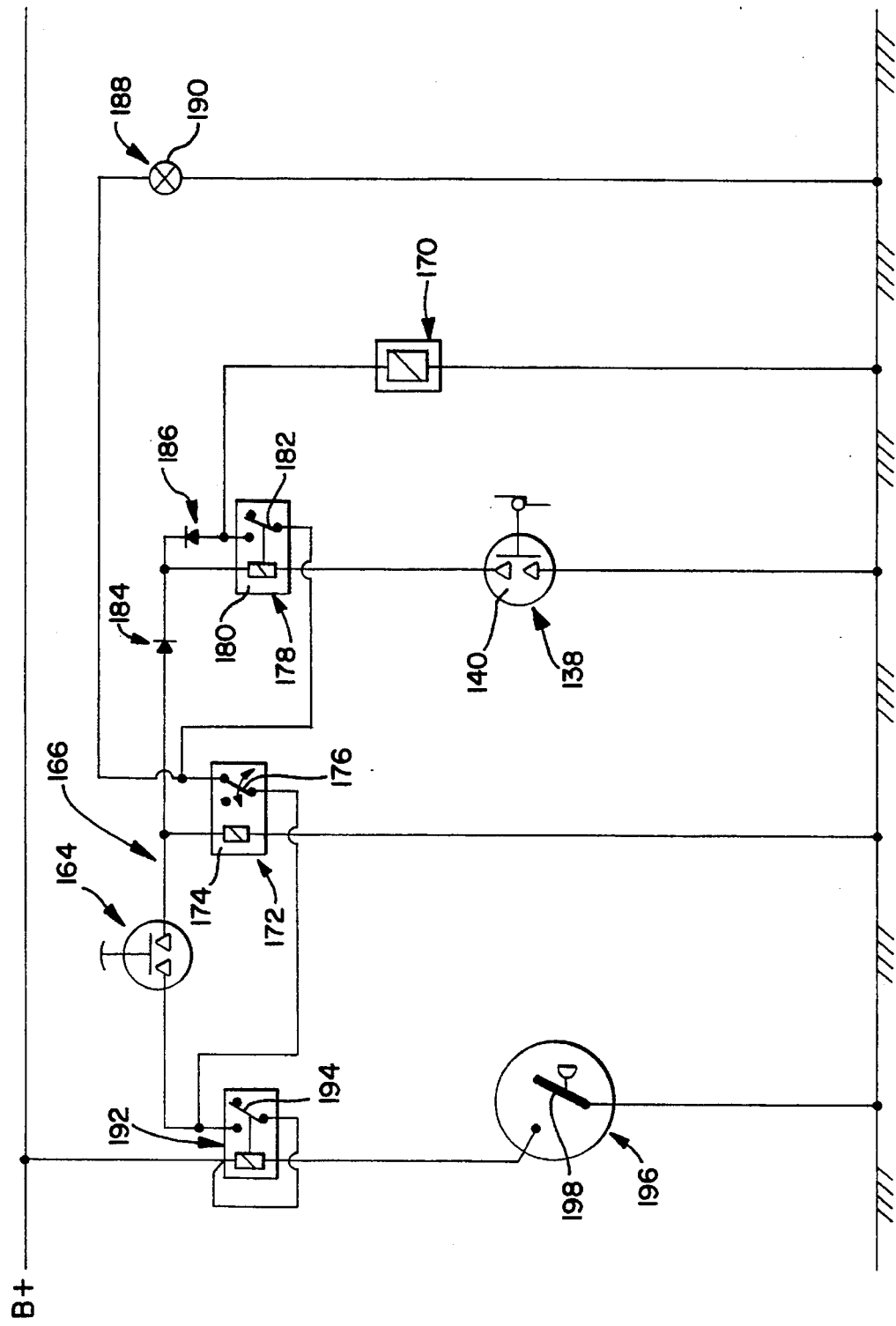
FIG. 5 is a schematic illustration of electrical circuitry for controlling operation of the drive mechanism and thereby operation of the material moving member.

An electrical system for controlling operation of the unloading conveyor according to the present invention is schematically shown in FIGS. 4 and 5. The electrical control system of the present invention is specifically designed to prevent unexpected movement of the unloading conveyor tube 38 and/or prevent unexpected operation of the material moving auger 40 following an interruption of power to the system as by shutting off the engine for any length of time. The control system of the present invention also prevents inadvertent re-engagement of the auger 40 when the conveyor tube 38 is moved from a transport position to an unloading position.

That portion of the electrical control system for preventing unexpected movement of the unloading tube 38 following starting of the engine is schematically illustrated in FIG. 4. The electrical control system includes an operator controlled three-position unloading switch 90 which is adapted for connection to a power source B+ such as the battery on the combine. In the illustrated embodiment, the unloading switch 90 is arranged in the cab region 30 of the combine and includes a movable contact 92 which is connected to the electrical power source. Switch 90 further includes a first or unloading terminal 94, a second or transport terminal 96, and a third or neutral terminal 98. A first electrical circuit 100 serves to connect the unloading terminal 94 of switch 90 to the actuator or driver 42. A second electrical circuit 102 serves to connect the transport terminal 96 of switch 90 to the actuator or driver 42. As will be described below, the control system of the present invention further includes logic circuitry arranged in combination with the first and second electrical circuits 100 and 102, respectively, for preventing unexpected movement of the unloading tube 38 upon starting of the engine.

As mentioned above, the actuator or driver 42 for swingably moving the unloading tube 38 between positions preferably includes a double acting hydraulic cylinder. As shown in FIG. 2, a conventional hydraulic valve assembly 104, mounted on the combine, is fluidically positioned between the hydraulic cylinder 42 and the source of pressurized hydraulic fluid. Returning to FIG. 4, first and second solenoid valves 110 and 112 are used in the first and second circuits 100 and 102, respectively, to correctly position the valve assembly 104 and thereby properly operate the driver 42 to position the unloading tube 38.

In the embodiment of the invention illustrated in FIG. 4, the first electrical circuit preferably includes a relay 114 having a normally open contact 116 which moves in response to energization of the relay 114. The electrical circuit further includes a sensor 118 for detecting the position of the unloading tube 38 relative to its fully outboard or outward position. As shown, the solenoid 110 is connected in series with the sensor 118. Sensor 118 preferably includes a switch 120. The purpose of switch 120 is to disengage solenoid 110 once actuator 42 has moved the unloading tube 38 to its fully outboard or outward position. Conveyor 38 is considered to be in its unloading position when it is not in its transport position.

In the illustrated embodiment of the invention, switch 120 has an operating arm 122 which carries a roller 124 at its free end. As shown, the roller 124 rides on a suitable cam surface 126 which moves in response to swinging movement of the unloading tube 38. When the unloading tube 38 is moved to its fully outward position, the roller 124 will ride down on a ramp 128 causing the switch 120 to open. Accordingly, switch 120 remains closed until tube 38 is in its fully outward position.

In the embodiment of the invention illustrated in FIG. 4, the second electrical circuit preferably includes a relay 134 having a normally open contact 136 which moves in response to energization of the relay 134. The electrical circuit further includes a sensor 138 for detecting the position of the unloading tube relative to its inboard or transport position. Sensor 138 preferably includes a switch 140 preferably carded in the saddle 39 and having an operating arm 142 which carries a roller 144 at its free end. The roller 144 contacts the unloading tube 38 when the tube is received in the saddle 39. In the illustrated embodiment, the switch 140 remains open when the unloading tube is in the saddle 39. When the unloading tube 38 is removed from the saddle 39, however, the roller 144 will move causing the switch 140 to close.

The electrical system for preventing unexpected movement of the unloading conveyor tube 38 further includes a two-state controller 150 which serves to enable either the first electrical circuit 100 or the second electrical circuit 102 as a function of the position of the unloading switch 90. In the illustrated embodiment, the two-state controller 150 is configured as a relay 152 having a normally open contact 154 which moves in response to energization of the relay 152 and is connected to the electrical power source B+ on the combine.

In a preferred form of the invention, the electrical system further includes an indicator 158 for providing an indication of when the unloading tube 38 is removed from the saddle 39. In the illustrated embodiment, the indicator 158 includes a lamp 160 preferably arranged in the cab region 30 of the harvester for providing a visual indication of when the unloading tube 38 has been removed from the saddle.

That portion of the electrical system for preventing unexpected operation of the material moving member 40 following starting of the engine and re-engagement of the member 40 when conveyor tube 38 is moved from the transport position to an unloading position is schematically illustrated in FIG. 5. The electrical control system further includes a manually operated two-position operational switch 164 which is adapted for connection to the electrical power source B+. In the illustrated embodiment, switch 164 is configured as a momentary pushbutton switch which is preferably arranged in the cab region 30 of the combine. An electrical circuit 166 serves to connect the switch 164 to the clutch actuator 74 (FIG. 3).

As mentioned above, the clutch actuator 74 for selectively operating the clutch 52 between clutch-engaged and disengaged position preferably comprises a hydraulic cylinder. As shown in FIG. 3, a hydraulic valve assembly 168 is fluidically positioned between the actuator 74 and the source of pressurized fluid 44. Returning to FIG. 5, a solenoid valve 170 is provided within the electrical circuitry 166 for controlling operation of the clutch actuator 74 (FIG. 3) and thereby conditioning the clutch 52 (FIG. 3) for operation between clutch-engaged and clutch-disengaged conditions.

In the embodiment of the invention illustrated in FIG. 5, the electrical circuit 166 preferably includes a two-state controller 172 that is responsive to the position of the operational switch 164. In the preferred form of the invention, the controller 172 is configured as a dipping relay 174 having a contact 176 which is connectable to the power source B+ and is movable in response to energization of the relay 174.

The electrical circuit 166 further includes a second two-state controller 178 that is connected to controller 172 and is likewise responsive to the position of the operational switch 164. In the preferred form of the invention, the controller 178 is configured as a relay 180 that is responsive to actuation of the switch 164 and has a contact 182 connected to the output of the controller 172. The relay 180 is grounded as through the sensor 138 for detecting the position of the unloading tube 38 relative to its inboard or transport position. The output of the relay 182 is connected to the solenoid 170 for controlling operation of the clutch actuator. A diode 184 is preferably used to isolate the controller 178 from inadvertently energizing the controller 172. Moreover, a diode 186 is preferably used to isolate the solenoid 170 from inadvertently receiving power from the switch 164.

In a preferred form of the invention, the electrical system further includes an indicator 188 for providing an indication of when the operator is trying to engage the material moving member 40. In the illustrated embodiment, the indicator 188 is configured as a lamp 190 preferably arranged in the cab region 30 of the combine for providing a visual indication of when the operator desires to engage the clutch 52 so as to operate the material moving member 40 thereby discharging grain from the grain tank or bin 32.

Advantageously, the present invention prevents movement of the unloading tube 38 and/or prevents operation of the material moving member 40 following a disruption of power to the electrical system, such as after the engine 20 of the combine has been shut off. The present invention also advantageously prevents inadvertent re-engagement of auger 40 when tube 38 is moved from its transport position to an unloading position.

As shown in FIGS. 4 and 5, the electrical system of the present invention is preferably connected to the power source B+ as through a relay 192 which includes a normally open contact 194 which moves in response to energization of the relay 192 and is connected to the power source B+. In the illustrated from of the invention, the relay 194 is grounded as through an oil pressure responsive switch 196 including a contact 198 which moves in response to the creation of oil pressure within the engine 20.

During continued combine operation, the unloading conveyor 36 is operated under the influence of the switch 90 and the operational switch 164. That is, during continued operation of the combine, moving the switch 90 to a first or unloading position will initiate movement of the unloading tube 38 into an unloading position under the influence of the driver 42. Conversely, moving the switch 90 to a second position will initiate movement of the unloading tube 38 into a transport position under the influence of the driver 42. When switch 90 is arranged in a neutral position, the driver 42 is disabled from positioning the unloading tube 38. Similarly, when the operational switch 164 is pushed, the switch 164 toggles drive mechanism 50 between disengaged and engaged positions, and the drive mechanism 50 will be enabled to operate the material moving member or auger 40 to discharge materials from the grain tank or bin 32.

As will be appreciated, the combine operator has a myriad of duties to perform during operation of the combine. For any of several reasons, the operator may shut down the combine by shutting off the engine 20 and leave the cab region 30 of the combine. Upon return, the operator may occasionally inadvertently move a switch or the operator may fail to remember the particular setting of a switch. With the present invention, and notwithstanding the particular setting of a switch, when the engine 20 of the combine is restarted following an interruption in operation, neither the combine unloading tube 38 nor the material moving member 40 will be operated until the operator purposefully resets the electrical system to operate the unloading conveyor 36 in a desired manner. Furthermore, if the operator neglects to shut off the auger 40 before returning tube 38 to saddle 39, the present invention automatically disengages the auger 40 and will not re-engage the auger 40 upon moving tube 38 into an unloading position until the electrical system is reset.

In operation, the oil pressure switch 196 detects operation of the engine and the contact 198 moves in response to oil pressure within the engine thus enabling energization of the relay 192. Energization of the relay 192 causes the contact 194 to move from its normally open position to connect the electrical system of the present invention to the power source. After the relay 192 changes state, power from B+ is delivered to the contact 92 of switch 90 and to the contact 154 of controller 150.

Upon starting of the engine 20, if switch 90 is conditioned such that the contact 92 is positioned in contact the first or unloading terminal 94, power is delivered to relay 114 of the electrical circuit 100. The logic circuitry of the electrical system, however, prevents energization of the actuator 42 and thereby prevents movement of the unloading tube 38. That is, although the switch 90 may be positioned to move the unloading tube 38, the first or unloading circuit 100 is not enabled to energize the solenoid 110 to move the unloading tube 38 because the contact 154 of controller 150 is in a normally open position. Thus, following starting of the engine 20, power is interrupted to the electrical circuit 100 and to the solenoid 110. Thus, the valve assembly 104 is not positioned to enable operation of the driver 42 and thereby movement of the unloading tube 38 is prevented.

Upon starting of the engine 20, if switch 90 is conditioned such that the contact 92 is positioned in contact with the second or transport terminal 96, power is delivered to the relay 134 of the electrical circuit 102. In a manner similar to that described above, however, the logic circuitry associated with the electrical system prevents movement of the unloading tube 38 toward a transport position. As described above, although power is delivered to the relay 134, the second or transport circuitry 102 is not enabled because the contact 154 of controller 150 is in a normally open position. Thus, power is not delivered to the solenoid 112 to enable operation of the driver 42.

On the other hand, if switch 90 is in a neutral position such that the contact 92 is positioned in engagement with the neutral contact 98, power is delivered simultaneously to the controller 150 and to the contacts 116 and 136 of relays 114 and 134, respectively. Because the switch 90 is in a neutral position, however, no power is delivered to either of the relays 114 and 134 in a manner enabling either of the solenoids 110 or 112, respectively, thus, the unloading tube 38 remains in the position it was prior to starting of the engine.

From the above, it will be appreciated that unexpected movement of the unloading tube 38 is prevented even if the switch 90 is in either a transport or unloading position upon starting of the engine 20. If, after starting of the engine, the operator desires to move the unloading tube 38, the operator must purposefully act to condition or reset the electrical system for moving the conveyor tube 38 to the desired position. That is, after starting of the engine, the operator must reset the control system by returning switch 90 to a neutral condition. Returning the switch 90 to a neutral condition causes the controller 150 to change state thereby delivering power to the contacts 116, 136 of relays 114, 134, respectively, of the first and second circuities 100 and 102. Thereafter, the operator may move the unloading switch 90 to either a transport or unloading position to move the unloading conveyor 36 in the desired manner.

After the electrical system has been purposefully reset, the operator may desire to move the unloading tube 38 to an unloading position. Accordingly, switch 90 is conditioned such that the contact 92 is moved to engage the unloading terminal 94 thus energizing relay 114. Since the electrical system has been purposefully reset by initially moving the switch 90 to a neutral position, power is delivered from the power source B+ to the contact 116 as through the changed state of controller 150. Energizing the relay 114 causes the contact 116 to move from its normally open position so as to enable the circuit 100. If the unloading tube 38 is in other than a fully outward position, the switch 120 will be closed. The closed switch 120 will allow energization of the solenoid 110 to control the associated valve of valve assembly 104 thereby operating the driver 42 to move the unloading tube 38 toward an unloading position. The actuator 42 will continue to swing the tube 38 toward an unloading position until the sensor 118 detects that the unloading tube 38 has reached a fully outward position. When the unloading tube 38 reaches the fully outward position, the contacts of the switch 120 opens thus disabling the solenoid 110 and thus preventing further operation of the driver 42.

Alternatively, after the electrical system has been purposefully reset, the operator may alternatively desire to move the unloading tube 38 to an inboard or transport position. As such, switch 90 is conditioned such that the contact 92 is moved to engage terminal 96 thus energizing relay 134. Since the electrical system has been purposefully reset by initially moving the switch 90 to a neutral position, power is directed to the contact 136 of relay 134 as through the changed state of the controller 150. As will be appreciated, energizing the relay 134 is dependent upon the position of the unloading tube 38. If the sensor 138 detects that the unloading tube 38 is in other than a transport position, switch 140 is closed thereby permitting the relay 134 to become energized. Energizing the relay 134 permits energization of the solenoid 112 and thus proper operation of the driver 42 to move the unloading tube 38 to a transport position. Movement of the unloading tube 38 toward a transport position under the influence of the driver 42 will continue until the unloading tube is received in the saddle 39. When the unloading tube is received in the saddle 39, the contacts of switch 140 open thereby disabling the solenoid 112 from further operating the driver 42.

The electrical system of the present invention will furthermore prevent inadvertent operation of the material moving member 40 upon restarting of the engine 20 of the combine. In the preferred form of the invention, the electrical system is required to be reset either when the engine 20 of the combine is shut off with the auger 40 engaged or when the auger 40 is engaged and the unloading tube 38 is in a transport position and releasably secured within the saddle 39.

In the illustrated embodiment, the controller 172 is configured to remain in the last position set by the operator through closure of the operational switch 164. Thus, if the clutch 52 for operating the auger 40 is engaged when the engine 20 is shut off, the contact 176 of the relay 174 would be in an ON position as shown in FIG. 5. When the engine 20 of the combine is shut off, however, the contact 182 of the relay 180 returns to its normally open position. In its normally open position, the controller 178 is not capable of energizing the solenoid 170 to position the valve assembly 168 (FIG. 3) to actuate the clutch driver or actuator 74. Thus, the clutch 52 remains disengaged upon restarting of the engine 20. Notably, with the controller 172 in the state shown in FIG. 5, and upon starting of the engine 20, the indicator lamp 190 is illuminated to provide a visual indication that the auger 40 is turned ON. Since there is no flow of material from the unloading tube 38, however, the indicator light 190 provides a visual indication to the operator that the electrical system must be reset before the material moving member 40 will be engaged to unload grain from the bin or tank 32.

Resetting of the electrical system is accomplished through manipulation of the switch 164. That is, actuating the switch 164 causes the relay 174 to change state. In the example illustrated, actuation of the switch 164 will cause the relay contact 176 to move from the ON position to the OFF or open position. When the relay 174 changes state, the indicator lamp 190 is disconnected from the power source thus indicating to the operator that the auger has been turned OFF. This actuation of the switch 164 furthermore causes energization of the relay 180. Of course, relay 180 will be energized only if the sensor 138 detects that the unloading tube 38 is not in the saddle 39. If the unloading tube 38 is in the saddle 39, the switch 140 of sensor 138 is open and thus prevents completion of the circuit and thereby prevents energization of the relay 180 thus disabling the solenoid 170 from positioning the valve assembly to actuate the clutch driver 74.

Completion of the resetting process requires the operator to again actuate the switch 164. This causes the relay 174 to again change state to an ON position. Thus, the relay contact 176 is in position to deliver power to the contact 182 of controller 178. If the unloading tube 38 is in other than a transport position, the relay 180 will be latched in place from the original actuation of the switch 164 and, thus, power can be delivered to the solenoid 170 to operate the actuator 74 and engage the clutch 52 to transfer power to the material moving member 40.

From the above it should be appreciated that if the controller 172 is in an OFF position upon staring of the combine engine 20, the material moving member 40 will be prevented from moving material through the unloading tube 38. As described above, when the controller 172 is in an OFF position, the contact relay 176 is in an open position and, thus, unable to deliver power to the controller 178. No power to the controller 178 means that the solenoid 170 will not be energized to position the valve assembly 168 to engage the actuator 74 (FIG. 3) and, thus, the clutch 52 remains in a disengaged condition. Moreover, with the controller 172 set in an OFF position, the indicator lamp 190 will provide a visual indication that the material moving member 40 is not ON thereby alerting the operator that something must be done before the material moving member 40 will remove material from the tank or bin 32. Of course, actuation of the switch 164 will cause the controller 172 to change state thereby providing power to the controller 178 while simultaneously causing relay 180 to change state and, ultimately provide power to the solenoid 170 to engage the clutch 52 and operate the auger 40.

Sensor 138 prevents operation of the material moving member or auger 40 when the conveyor tube 38 is in the transport position. As described above, switch 140 is open when the conveyor tube 38 is in the transport position. When switch 140 is opened, relay 180 changes state thereby disengaging power to solenoid 170 and thereby preventing operation of the auger 40. In order for power to be provided to solenoid 170 after switch 140 is open, sensor 138 must sense that the conveyor tube 38 is in other than the transport position and the electrical circuit must be reset. It should be appreciated that the electrical circuit is reset when the conveyor tube 38 is in the unloading position by the operation of switch 164 which provides power to sensor 138. As will be understood, once relay 180 is powered, relay 180 changes state to change the position of contact 182 to a closed position. Accordingly, solenoid 170 will thereafter be provided power to engage the clutch 52 and operate the auger 40.

From the above, it should be appreciated that the electrical system of the present invention prevents unexpected movement of the unloading tube 38 following an interruption in power to the electrical system. The present invention also prevents unexpected operation of the unloading auger 40 upon restarting of the engine of the combine as well as re-engagement of the auger 40 when tube 38 is moved from the transport position to the unloading position. Moreover, the electrical system of the present invention prevents operation of the auger 40 when the unloading tube 38 is in a transport position. Thus, should the operator fail to return switch 90 to a neutral position, the electrical system of the present invention will prevent accidental engagement of the driver 42 when the operator returns to the combine and starts the engine without realizing the position of the switches. Moreover, grain will not be inadvertently lost from the clean grain tank as a result of the operator inadvertently failing to properly position the operational switch so as to prevent inadvertent engagement of the auger.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A control system for controlling operation of an agricultural combine unloading conveyor, said unloading conveyor having an actuator for swinging said unloading conveyor between a transport position and an unloading position, said control system comprising:

an operator controlled switch adapted for connection to a power source on the combine, said switch being shiftable to any of three different positions including a first position for initiating movement of said unloading conveyor into an unloading position under the influence of the actuator, a second position for initiating movement of said unloading conveyor into a transport position under the influence of the actuator, and a neutral position whereat said actuator is disabled from positioning said unloading conveyor; and an electrical system for connecting said switch to said actuator, said electrical system comprising first electrical circuitry for connecting said switch to said actuator and for moving said unloading conveyor to said unloading position when said switch is in said first position, said first electrical circuitry further including a sensor for detecting when said unloading conveyor is in a position other than a transport position, second electrical circuitry for connecting said switch to said actuator and for moving said unloading conveyor to a transport position in response to said switch being positioned in said second position, said second electrical circuitry further including a sensor for detecting when said unloading conveyor is in a fully outward position, and a two-state controller connected to said power source and to each of said electrical circuitries, said controller being operable in a first state to enable either of said electrical circuitries to move said unloading conveyor between a transport position and said unloading position as a function of the position of said switch as long as power is uninterrupted to said switch since the unloading conveyor was last positioned, and wherein said controller moves to a second state in response to an interruption in power to the switch, and wherein when said controller is in said second state the controller prevents actuation of the actuator and, upon restoration of power to the switch, prevents movement of the unloading conveyor until after the unloading switch is returned to a neutral position.

2. The control system according to claim 1 wherein said sensor for detecting when said unloading conveyor is in a transport position comprises a two-state electrical switch connectable to a frame of the combine and included within said first circuitry, said electrical switch being cooperative with said unloading conveyor such that when unloading conveyor is in a transport position said electrical switch is in a first state and when said unloading conveyor is in other than a transport position said electrical switch is in a second state.

3. The control system according to claim 1 wherein said sensor for detecting when said unloading conveyor is in a fully outward position comprises a two-state electrical switch included within said second circuitry and cooperable with a contact member mounted on and movable with the unloading conveyor.

4. The control system according to claim 1 wherein said actuator comprises a linearly distendable hydraulic actuator which is coupled to a pump and an associated hydraulic fluid sump.

5. The control system according to claim 1 wherein said two-state controller includes a relay which is connectable to said power source and serves to power said first and second electrical circuitries as a function of the position of said unloading switch.

6. A control system for controlling operation of an agricultural combine unloading conveyor, said unloading conveyor being movable from a transport position to an unloading position and includes a material moving member, and a drive mechanism for operating the material moving member including a clutch shiftable between clutch engaged and clutch disengaged positions, said control system comprising:

a manually operated two position operational switch adapted for connection to a power source on the combine; and an electrical circuit arranged between said switch and a clutch actuator for controlling operation of said clutch between clutch engaged and clutch disengaged positions thereby controlling operation of said material moving member, said electrical circuit including a first two state controller that is responsive to the position of said operational switch, and a second two state controller connected to said first controller and which is responsive to the position of said operational switch and to a sensor which detects the position of said unloading conveyor relative to said transport position, and wherein upon interruption of power to said operational switch since the last operation of the material moving member said electrical circuit is disabled and thereby prevented from operating said clutch actuator thus disabling the material moving member from operating until the operational switch is manually operated to reset the controllers of the electrical circuit whereby enabling the electrical circuit to operate the clutch actuator and shift the clutch to a clutch engaged position thereby operating the material moving member as long as said sensor detects that the unloading conveyor is in other than a transport position.

7. The control system according to claim 6 wherein said sensor comprises a two-state electrical switch connected to said second two-state controller and mounted on a frame of the combine to cooperate with the unloading conveyor such that when said unloading conveyor is in a transport position said switch is in a first state and when said unloading conveyor is in other than a transport position said switch is in a second state.

8. The control system according to claim 6 wherein said operational switch is a momentary switch.

9. A control system for controlling operation of an agricultural combine unloading conveyor, said unloading conveyor being movable from a transport position to an unloading position and includes a material moving member, and a drive mechanism for operating the material moving member including a clutch shiftable between clutch engaged and clutch disengaged positions, said control system comprising:

a manually operated two position operational switch adapted for connection to a power source on the combine; and an electrical circuit arranged between said switch and a clutch actuator for controlling operation of said clutch between clutch engaged and clutch disengaged positions thereby controlling operation of said material moving member, said electrical circuit including a first two state controller that is responsive to the position of said operational switch, and a second two state controller connected to said first controller and which is responsive to the position of said operational switch and to a sensor which detects the position of said unloader conveyor relative to said transport position, and wherein when said sensor detects said unloader conveyor is in said transport position and said switch is positioned to enable said clutch actuator to engage said clutch, said electrical circuit disables said clutch actuator thereby preventing said clutch actuator from operating said clutch thus disabling the material moving member until the circuit is reset by manually operating the switch thereby conditioning said controllers to enable said clutch actuator to operate said clutch as long as said sensor detects said unloader conveyor is in other than a transport position.

10. The control system according to claim 9 wherein said electrical circuit further includes an indicator for indicating when said clutch is in said clutch engaged position attempting to operate said material moving member.

11. The control system according to claim 9 wherein said sensor comprises a two-state electrical switch connected to said second two-state controller and mounted on a frame of the combine to cooperate with the unloading conveyor such that when said unloading conveyor is in a transport position said switch is in a first state and when said unloading conveyor is in other than a transport position said switch is in a second state.

12. The control system according to claim 9 wherein said operational switch is a momentary switch.

13. A control system for controlling operation of an agricultural combine unloading conveyor, said unloading conveyor being movable from a transport position to an unloading position and includes a material moving member, and a drive mechanism for operating the material moving member including a clutch shiftable between clutch engaged and clutch disengaged positions, said control system comprising:

a manually operated two position operational switch adapted for connection to a power source on the combine; and an electrical circuit arranged between said switch and a clutch actuator for controlling operation of said clutch between clutch engaged and clutch disengaged positions thereby controlling operation of said material moving member, said electrical circuit including a first two state controller that is responsive to the position of said operational switch, and a second two state controller connected to said first controller and which is responsive to the position of said operational switch and to a sensor which detects the position of said unloading conveyor relative to said transport position, and wherein said electrical circuit is disabled from operating said material moving member as long as said sensor detects said unloading conveyor is in its transport position and until said operational switch is manually operated to reset the controllers of said electrical circuit and said sensor detects said unloading conveyor is removed from its transport position whereby enabling the electrical circuit to operate the clutch actuator and shift the clutch to a clutch engaged position thereby operating the material moving member.

14. The control system according to claim 13 wherein said electrical circuit further includes an indicator for indicating when said clutch is in said clutch engaged position.

15. The control system according to claim 13 wherein said sensor comprises a two-state electrical switch connected to said second two-state controller and mounted on a frame of the combine to cooperate with the unloading conveyor such that when said unloading conveyor is in a transport position said switch is in a first state and when said unloading conveyor is in other than a transport position said switch is in a second state.

16. A control system for controlling operation of an agricultural combine unloading conveyor, said unloading conveyor having an actuator for swinging said unloading conveyor between a transport position and an unloading position, said control system comprising:

an operator controlled unloading switch adapted for connection to a power source on the combine, said switch being conditioned in any one of three different conditions including a first condition wherein said switch initiates movement of said unloading conveyor into a transport position under the influence of the actuator, a second condition wherein said switch initiates movement of said unloading conveyor into an unloading position under the influence of the actuator, and a neutral condition whereat said actuator is disabled from positioning said unloading conveyor; and an electrical system responsive to the position of the unloading conveyor and for connecting said switch to said actuator, said electrical system further including circuitry for preventing actuation of said actuator and thereby preventing unexpected movements of the unloading conveyor following disruption of power to the unloading switch until the unloading switch is conditioned in the neutral condition to thereby reset the electrical circuit following restoration of power to the control system and thence manually moved to either of the other two conditions.

17. The control system according to claim 16 wherein said actuator for swinging the unloading conveyor includes a double-acting hydraulic cylinder, and wherein said electrical system includes a first electrical circuit connected to said unloading switch and to a first electrically controlled valve for controlling operation of said cylinder in a first direction, and a second electrical circuit connected to said unloading switch and to a second electrically controlled valve for controlling operation of said cylinder in a second direction opposed to said first direction.

18. The control system according to claim 17 wherein said first electrical circuit includes a sensor for monitoring the position of said unloading conveyor relative to a transport position, and said second electrical circuit includes a sensor for monitoring the position of said unloading conveyor relative to a fully outward position.

19. The control system according to claim 17 wherein said electrical system further includes a two-state relay connectable to the power source on the combine and which responds to the position of said unloading switch for enabling said first and second circuits.

20. The control system according to claim 18 wherein said first electrical circuit further includes an indicator for providing an indication of when said unloading conveyor in a position other than said transport position.

21. A control system for controlling operation of an unloading conveyor of an agricultural combine including a frame having a cab region toward a front end thereof and with the unloading conveyor being mounted on the frame of the combine for swinging movement between a transport position and an unloading position, said unloading conveyor including a material moving member, and a drive mechanism for operating the material moving member including a clutch shiftable between clutch engaged and clutch disengaged positions by a clutch actuator, said control system comprising:

a manually operated switch connected to a power source and arranged in the cab region of the combine; and an electrical system responsive to the position of the unloading conveyor for connecting the switch to the clutch actuator to selectively control operation of the clutch and thereby the material moving member as a function of the actuation of the switch, said electrical system further including circuitry for preventing said clutch actuator from operating the clutch and thereby preventing operation of said material moving member of the unloading conveyor following an interruption of power to the switch and until the electrical system is reset through manual manipulation of the switch.

22. The control system according to claim 21 wherein said electrical system includes a first dipping relay connected to the power source on the combine and is responsive to said manually operated switch, and a second relay connected to an output of said first dipping relay and is responsive to said manually operated switch.

23. The control system according to claim 22 wherein said drive mechanism includes a driving belt and said clutch comprises a belt idler shiftable under the influence of the clutch actuator between clutch engaged position and clutch disengaged position.

24. The control system according to claim 23 wherein said clutch actuator comprises a hydraulic cylinder, and said electrical system further includes an electrically controlled valve for controlling operation of cylinder and thereby operation of said clutch.

25. The control system according to claim 22 wherein said electrical system further includes a sensor for monitoring the position of said unloading conveyor relative to said transport position, said sensor being electrically connected to said second relay to effect operation of said clutch actuator and thereby operation of the material moving member as a function of the position of said unloading conveyor relative to said transport position.

26. A control system for controlling operation of an unloading conveyor mounted on a mobile frame of an agricultural combine, said unloading conveyor being mounted on the frame for swinging movement between transport and unloading positions under the influence of an actuator, said unloading conveyor having a material moving member arranged in combination therewith, said material moving member being operated under the influence of a clutch mechanism operable between an engaged condition during which the clutch mechanism transmits power to the material moving member and a disengaged condition, said control system comprising:

a first switch adapted for connection to a power source on the combine, said first switch being displacable from a neutral position selectively to a transport position or to an unloading position in order to initiate operation of the actuator and thereby movement of the unloading conveyor between the transport and unloading positions, respectively;

a second switch adapted for connection to the power source on the combine, said second switch being displacable from a disengaged position to an engaged position in order to initiate operation of the clutch mechanism between disengaged and engaged conditions, respectively, thereby controlling operation of the material moving member; and an electrical system for connecting said first and second switches to said actuator and to said clutch mechanism, respectively, said electrical system including sensors for detecting the position of the unloading conveyor relative to its transport position and electrical circuitry for preventing actuation of said swing actuator and thereby preventing unexpected movements of the unloading conveyor following disruption of power to the first switch until the electrical circuitry is reset by moving said first switch to a neutral position following restoration of power to said first switch, said electrical circuitry being further configured to prevent the clutch mechanism from being engaged following disruption of power to the second switch and until the electrical system is manually reset through manipulation of the second switch following restoration of power to the second switch.

27. The control system according to claim 26 wherein said actuator for swinging said unloading conveyor between positions includes a linearly distendable double acting hydraulic cylinder, and wherein said electrical circuitry includes an electrically controlled valve assembly for controlling operation of said hydraulic cylinder and thereby controlling the position of said unloading conveyor.

28. The control system according to claim 27 wherein said electrical circuitry for preventing actuation of said actuator comprises a first electrical circuit connected between said first switch and a first valve of said valve assembly for enabling distention of said cylinder in response to movement of the first switch to its unloading position, a second electrical circuit connected between said first switch and a second valve of said valve assembly for enabling retraction of said cylinder in response to movement of the first switch to its transport position, and a relay connected between said first and second circuits and said first switch for directing power to the circuits from the power source.

29. The control system according to claim 28 wherein said electrical system further includes an apparatus for indicating that the electrical system requires resetting before the material moving member is operational following disruption of power to the second switch.

30. The control system according to claim 28 wherein said electrical system further includes an apparatus for indicating that the electrical system requires resetting before the material moving member is operational following said unloading conveyor being moved to said unloading position from said transport position when said clutch mechanism is in said engaged condition.

31. The control system according to claim 28 wherein the electrical system is reset by operating the second switch which disables the indicating apparatus and reams the electrical system to permit operation of the material moving member as long as said unloading conveyor is not in a transport position.

32. A combine for harvesting crop materials from a field and having a clean storage bin for storing cleaned harvested materials received from a threshing assembly mounted on a frame of the combine, a propulsion assembly for propelling the frame of the combine across the field while driving the threshing assembly, an unloading conveyor for unloading materials from the storage bin, said conveyor being swingable between a transport position and an unloading position, a hydraulic actuator for moving the unloading conveyor between said positions, and a control system for operating the hydraulic actuator, said control system comprising:

electrically controlled valves connected in controlling relation to said actuator;

a source of pressurized fluid connected to said valves;

an unloading control switch connected to a power source on the combine and which can be displaced from a neutral position selectively to a transport position or to an unloading position in order to initiate setting of the unloading conveyor in the transport or unloading positions, respectively; and an electrical system for connecting the control switch to the valves controlling the hydraulic actuator, said electrical system including sensors for detecting the position of the unloading conveyor relative to the transport and unloading positions, said electrical system further including electrical circuitry connected to said sensors for disabling said valves from operating said actuator following disruption of power to said control switch thereby preventing unexpected movement of the unloading conveyor upon restoration of power, and wherein the electrical circuitry maintains said valves in a disabled state following restoration of power until the control switch is conditioned in a neutral position whereafter the valves are enabled to operate the actuator and position the unloading conveyor as a function of the position of said conveyor as detected by said sensors.

33. The combine according to claim 32 wherein said electrical circuitry comprises a first electrical circuit connected to said control switch and to one of said valves for controlling said actuator to move said unloading conveyor to a transport position when said control switch is in a transport position, a second electrical circuit connected to said control switch and to another of said valves for controlling said actuator to move said unloading conveyor to an unloading position when said control switch is in an unloading position, and a two-state controller connected to said control switch and to the source of power on the combine for detecting when there is an interruption of power to the control switch and thereby disabling said first and second circuities from operating said actuator until said controller is reset by repositioning the control switch to a neutral position.

34. The combine according to claim 33 wherein said two-state controller includes a relay which is responsive to the supply of electrical power thereto.

35. The combine according to claim 32 wherein said electrical system further includes a sensor for detecting whether said propulsion assembly is being operated to propel the combine across the field, and wherein said sensor is arranged in the electrical system such that power is disrupted to the control switch when said propulsion assembly is disabled from moving the combine across the field and power is delivered to said control switch when said propulsion assembly is enabled to move the combine across the field.

36. The combine according to claim 35 wherein said sensor for detecting whether said propulsion assembly is being operated comprises an engine oil pressure switch.

37. A combine for harvesting crop materials from a field, said combine having a mobile frame supported for movement across the field and including a cab region toward a forward end thereof, a clean storage bin mounted on the frame for storing cleaned grain materials therein, an unloading conveyor for removing materials from the storage bin and including a material moving member, said unloading conveyor being movable between transport and unloading positions, and a hydraulically actuated clutch mechanism for driving said material moving member of the unloading conveyor, said clutch mechanism being operable between a clutch engaged position during which driving power is transmitted through said clutch mechanism to operate said material moving member and a clutch disengaged position during which driving power is effectively disconnected from operating the material moving member, and a control system for controlling operation of the clutch mechanism and thereby the material moving member, said control system comprising:

an electrically controlled valve connected in controlling relation to said hydraulic actuator;

a source of pressurized fluid connected to said valve;

an operator controlled switch connected to a power source on the combine and which is selectively displacable from a first position to a second position to initiate engagement of the clutch mechanism and operation of the material moving member; and an electrical system for connecting the operator controlled switch to the valve controlling the hydraulic actuator, said electrical system including a sensor for detecting the position of the unloading conveyor relative to its transport position, said electrical system further including electrical circuitry for preventing engagement of the clutch mechanism and thereby preventing operation of the material moving member following an interruption of power to the operator controlled switch until the electrical system is manually reset through manipulation of the switch and the sensor detects that the unloading conveyor is in other than a transport position.

38. The combine according to claim 37 wherein said electrical circuitry includes a two-position dipping relay connected to the power source on the combine and the operator controlled switch such that as the operator displaces the operator controlled switch between positions the dipping relay changes positions in response thereto, and a two-position relay connected to the operator controlled switch and to an output of said two position dipping relay, an output of said relay acting to control said valve of the hydraulic actuator, said relay being further responsive to the sensor detecting the position of the unloading conveyor relative to its transport position.

39. The combine according to claim 37 wherein said electrical system further includes a sensor for detecting whether the propulsion assembly is operational to propel the combine across the field and wherein said sensor is arranged in the electrical system for disrupting power to the operator controlled switch when said propulsion assembly is disabled from moving the combine across the field and power is delivered to said operator controlled switch when said propulsion assembly is enabled to move the combine across the field.

40. The combine according to claim 37 wherein said electrical system further includes second electrical circuitry for automatically disengaging said material moving member when said unloading conveyor is in said transport position.

41. The combine according to claim 40 wherein said material moving member remains disengaged until said electrical system is reset through manipulating of the switch.

42. A combine for harvesting crop materials from a field and having a storage bin for storing cleaned harvested materials received from a threshing assembly mounted on a frame of the combine, an engine for propelling the combine frame across the field while concomitantly driving said threshing assembly, an unloading tube swingable from a transport position to an unloading position and conversely under the influence of a hydraulic loader actuator, an auger operable in combination with the unloading tube for discharging cleaned harvested materials from the storage bin, an auger drive system including a clutch mechanism operable between engaged and disengaged conditions under the influence of a hydraulic auger actuator, and a control system for controlling the position of the unloading tube and operation of said auger, said control system comprising:

a first electrically controlled valve assembly connected in controlling relation to said hydraulic unloading actuator;

a second electrically controlled valve assembly connected in controlling relation to said hydraulic auger actuator;

a source of pressurized fluid carried on the frame of the combine and connected to said first and second valve assemblies;

an unloading control switch connected to a power source on the combine and which is displacable from a neutral position selectively to a transport position or to an unloading position to initiate setting of the unloading tube in the transport or unloading positions, respectively;

a two-position auger control switch connected to the power source on the combine and which is selectively displacable from a first position to a second position to initiate engagement of the clutch mechanism and thereby effect operation of the auger to unload the storage bin of cleaned harvested materials;

an electrical system for connecting said unloading control switch to the hydraulic unloading actuator and said auger control switch to the hydraulic auger actuator, respectively, said electrical system including sensors for detecting the position of the unloading tube relative to said transport position and conditioned in circuitry for disabling the first valve assembly from controlling said hydraulic unloading actuator to prevent unexpected movements of the unloading tube following disruption of power to the unloading control switch, said first valve assembly remaining disabled until the unloading control switch is conditioned in to a neutral position following restoration of power to the unloading control switch, said conditioned in circuitry being configured to disable the second valve assembly from operating the hydraulic auger actuator to prevent engagement of the clutch mechanism following disruption of power to the auger control switch, said second valve assembly remaining disabled until the auger control switch is manually manipulated following restoration of the power to the auger control switch, and said conditioned in circuitry being further configured to disable the second valve assembly from operating the hydraulic auger actuator to prevent engagement of the clutch mechanism when said unloading tube is placed in said transport position, said second valve assembly remaining disabled until the auger control switch is manipulated.

\* \* \* \* \*